UNITED STATES PATENT OFFICE.

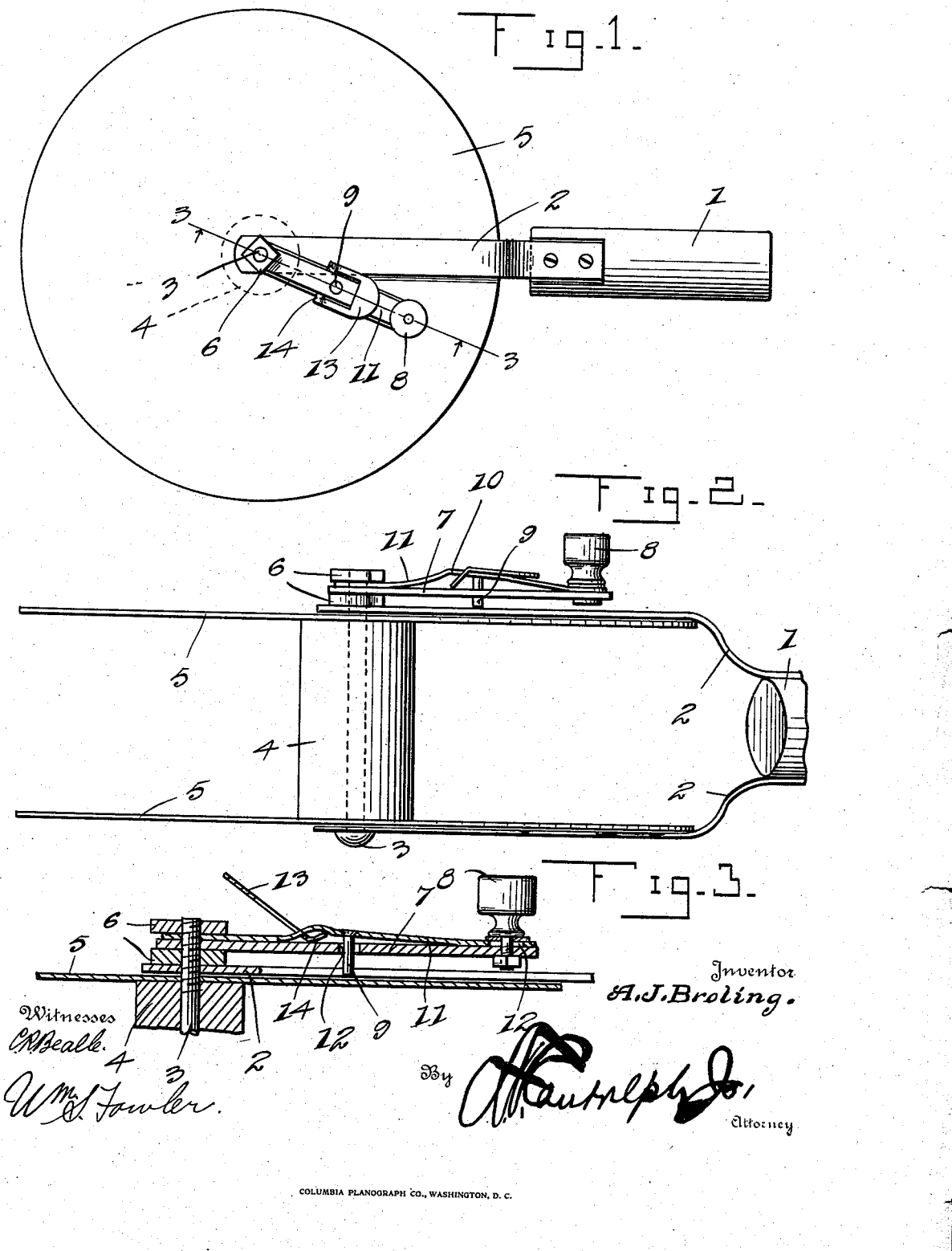

ANDREW J. BROLING, OF CHICAGO, ILLINOIS.

CRANK-HANDLE.

1,150,659.

Specification of Letters Patent. Patented Aug. 17, 1915.

Application filed May 15, 1914. Serial No. 838,738.

*To all whom it may concern:*

Be it known that I, ANDREW JOHN BROLING, a citizen of the United States, residing at Chicago, in the county of Cook and State of Illinois, have invented certain new and useful Improvements in Crank-Handles, of which the following is a specification.

This invention comprehends certain new and useful improvements in crank handles and has for its primary object to provide a device of this character which will be of such construction and operation that the shaft of a reel or the like may be readily locked against rotation in either direction, when desired.

Another object is to provide a device of this character which will be of extremely simple construction and operation and provided with a novel and improved locking means carried by the crank handle and which may be readily operated by the hand employed for winding or unwinding the reel, thereby making it unnecessary to employ both hands when operating the reel.

This invention has for a still further object to generally improve and simplify the construction and operation of devices of this character and increase the efficiency thereof without increasing the cost of the same.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 1 is a side elevation of my invention applied to a reel, Fig. 2 is an elevational view at right angles to Fig. 1, and Fig. 3 is a detail sectional view on the line 3—3 of Fig. 1 with the locking device in operative position.

Referring in detail to the drawings by numerals, 1 designates a supporting handle to which is secured the inner ends of the spaced supporting arms 2, in the outer ends of which are mounted the opposite ends of the shaft 3, the body 4 and spaced side flanges 5 of said reel being mounted upon the shaft 3 between the supporting arms 2. It will be understood that the flanges 5 are rigid with the body 4 of the reel and said flanges 5 and body 4 are adapted to rotate with the shaft 3.

One end of the shaft 3 is extended beyond the supporting arm 2 through which it extends, and has a pair of clamp nuts 6 mounted thereon, between which is positioned an operating arm or crank handle 7 having the handle 8 secured in its free end and extending laterally therefrom, it being understood that said operating arm or crank handle 7 is rigidly clamped for rotation with the shaft 3, by means of the clamp nuts 6.

In order to lock the reel against rotation upon the shaft 3, I have provided a locking pin 9 carried by the upwardly offset portion 10 of the leaf spring 11 and projecting through a suitable opening 12 in said operating arm or crank handle 7, said pin being adapted, when in operative position to engage the proper side of the supporting arm 2 over which the arm 7 rotates, and thereby lock the reel against rotation in one direction. Should it be desired to lock the reel against rotation in the opposite direction, the pin 9 is allowed to be moved to operative position when upon the opposite side of the supporting arm 2. The leaf spring 11 has one end secured between the operating arm or crank handle 7 and one of the clamp nuts 6, while the opposite end of said leaf spring is clamped between the operating arm or crank handle 7 and the handle 8 and provided with a suitable slot 13 to allow a limited longitudinal movement of said leaf spring and thereby permit proper operation of the same. When it is desired to again release the reel by drawing the locking pin upwardly, the cam locking link 13 is swung to operative position, thereby pressing the cam portion 14 of said link 13 against the outer face of the leaf spring 11, forcing the central or offset portion of said leaf spring outwardly and thereby drawing the locking pin 9 to inoperative position, the free end of said cam releasing link moving to position upon the outer face of said leaf spring 11. It will be readily seen that danger of the pin 9 moving to inoperative position accidentally is eliminated and the reel may therefore be readily rotated in either direction until the cam releasing link 13 is again moved in operative position, as shown in Fig. 3, when the leaf spring 11 will serve to immediately return the locking pin 9 to operative position automatically and thereby prevent further rotation of the reel in one direction and limit rotation of said reel in the opposite direction by engagement of said pin 9 with the opposite sides of the supporting arm 2.

While I have shown and described the preferred embodiment of my invention, it will be understood that minor changes in the details of construction, combination and arrangement of parts may be made without departing from the spirit and scope of the invention as claimed, or sacrificing any of the advantages thereof.

What is claimed is:—

A device of the class described comprising the combination with supporting arms, a shaft mounted for rotation in said arms, a handle secured to one end of said shaft for the rotation of said shaft, a spring extending the entire length of said handle and secured to the outer face thereof, said spring having an offset portion intermediate its ends, said spring also provided with a slot adjacent the offset portion, a locking pin secured to said spring adjacent the slot and extending through said handle, a cam lever in said slot, the working end bearing against the outer surface of said handle, said cam lever adapted to withdraw the locking pin from engagement with the arms to permit the rotation thereof.

In testimony whereof I affix my signature in presence of two witnesses.

ANDREW J. BROLING.

Witnesses:
A. G. JOHNSON,
A. P. OBERG.

Copies of this patent may be obtained for five cents each, by addressing the "Commissioner of Patents, Washington, D. C."